United States Patent [19]

Agostini et al.

[11] Patent Number: 6,111,008

[45] Date of Patent: Aug. 29, 2000

[54] TIRE WITH SILICA REINFORCED TREAD WHICH CONTAINS SPECIFIED CARBON BLACK

[75] Inventors: Giorgio Agostini, Colmar-Berg, Luxembourg; Pierre Marie Jean Dauvister, Arlon, Belgium; Jean-Claude Joseph Marie Kihn, Hollenfels, Luxembourg

[73] Assignee: The Goodyear Tire & Rubber Company, Akron, Ohio

[21] Appl. No.: 08/937,488

[22] Filed: Sep. 25, 1997

[51] Int. Cl.[7] .............................. C08K 3/04; C09C 1/48; B60C 1/00
[52] U.S. Cl. ................... 524/496; 524/495; 524/493; 423/449.1; 252/511; 152/209 R
[58] Field of Search .................... 524/496, 495, 524/493; 423/449.1; 252/511; 152/209 R

[56] References Cited

U.S. PATENT DOCUMENTS

| | | | |
|---|---|---|---|
| 3,873,489 | 3/1975 | Thurn et al. | 524/495 |
| 5,480,626 | 1/1996 | Klasen et al. | 423/449.1 |
| 5,739,198 | 4/1998 | Sandstrom et al. | 524/493 |

*Primary Examiner*—James J. Seidleck
*Assistant Examiner*—Olga Asinovsky
*Attorney, Agent, or Firm*—Henry C Young, Jr.

[57] ABSTRACT

This invention relates to a tire with tread of rubber composition quantitatively reinforced with silica and containing only a minimal amount of carbon black, wherein the carbon black is characterized by having a DBP value in a range of about 280 to about 600 and an Iodine Number value in a range of about 550 to about 1200 and where carbon blacks having DBP and Iodine Numbers of less than such values are substantially excluded from the rubber composition.

6 Claims, No Drawings

TIRE WITH SILICA REINFORCED TREAD WHICH CONTAINS SPECIFIED CARBON BLACK

FIELD

The invention relates to a tire tread of rubber composition which is substantially reinforced with particulate silica but which also contains a relatively small amount of carbon black reinforcement.

BACKGROUND

Carbon black reinforcement for tire treads conventionally provides a suitable increase in electrical conductivity for the rubber composition to dissipate buildup of static electricity from the vehicle to the road as well as a suitable increase in thermal conductivity to reduce the heat buildup in the tire tread during its use under working conditions.

However, it is sometimes desired to utilize a rubber composition for a tire tread where its reinforcement is substantially silica with an accompanying substantial reduction in the content of carbon black reinforcement. As a result, electrical conductivity as well as thermal conductivity of the tire tread rubber composition may be somewhat compromised.

For example, reinforcing filler in an amount of about 35 to about 80, or sometimes more, phr is often used for a tire tread rubber composition. A threshold of about 35 or 40 phr of carbon black is usually sufficient for most purposes to provide adequate electrical conductivity for static electricity and thermal conductivity for heat dissipation for a tire tread rubber composition. However, when a substantial portion of the reinforcing filler is silica with an attendant reduction in the quantity of carbon black, such as, for example, less than the aforesaid about 35 phr of carbon black, the tread's electrical conductivity and thermal conductivity may both be compromised.

Indeed, such a quantitatively silica reinforced tire tread having, for example, a content of at least 40 phr of silica and 25 phr or less carbon black may have a volume electrical resistivity of 10 to the 12th ohm-cm or more. Such volume electrical resistivity may suitably be determined by DIN 53682 or ASTM Method D257-92.

STATEMENT AND PRACTICE OF THE INVENTION

In accordance with this invention, a tire is provided having a tread of a rubber composition comprised of, based upon 100 phr of elastomer(s), (A) 100 phr of at least one diene-based elastomer, (B) about 35 to about 110, alternatively about 40 to about 90, phr of reinforcing filler composed of about 15 to about 25, alternatively about 15 to about 20, phr of carbon black and correspondingly about 20 to about 85, alternatively about 20 to about 90, phr of precipitated silica and (C) a silica coupler having a moiety reactive with silanol groups on the surface of said silica and another moiety interactive with at least one of said diene-based elastomers; characterized in that said carbon black consists of at least 10, and preferably at least 30, phr of a first carbon black characterized by having a DBP adsorption value in a range of about 280 to about 600 cm$^3$/100 g and an Iodine adsorption value in a range of about 550 to about 1200 g/kg and not more than 8 phr of a second carbon black characterized by DBP adsorption value in a range of about 100 to about 150 cm$^3$/100 g and an Iodine adsorption value in a range of about 40 to about 150 g/kg.

In one aspect, the said second carbon black may be present as a carrier for the aforesaid silica coupler, particularly when the silica coupler is a liquid compound which may be the case when it is a bis(trialkoxysilylalkyl) polysulfide such as, for example, a bis(triethoxysilylpropyl) polysulfide which contains an average, for example, of from 2 to 5 sulfur atoms in its polysulfidic bridge.

The philosophy is to enhance both the electrical and thermal conductivity of a quantitatively silica reinforced tire tread rubber composition with a relatively low reinforcing carbon black.

Indeed, the philosophy is to provide a tire tread rubber composition having a volume electrical resistivity of less than 10 to the eighth ohm-cm and an acceptable thermal conductivity by using a carbon black which could not otherwise normally be used in a tire tread rubber composition because of its relatively low rubber reinforcing ability as compared to carbon blacks of higher rubber reinforcing ability.

However, in the event of utilization of only a minimal amount of carbon black for reinforcement of the tire tread rubber composition in reliance of a more quantitative use of silica reinforcement, enhancement of the rubber composition's both electrical conductivity and thermal conductivity become a more direct consideration.

Conventional, relatively high reinforcing, carbon blacks conventionally used for the reinforcement of tire tread rubber compositions may have a DBP adsorption value, for example, in a range of about 100 to about 150 cm$^3$/100 g and an Iodine adsorption value, for example, in a range of about 90 to about 150 g/kg.

Thus, the primary carbon black required in the practice of this invention differs substantially from such more conventional high reinforcing carbon black in both the DBP and the Iodine value characteristics.

The DBP (dibutylphthalate) value can be suitably determined by ASTM Method D2414 and the Iodine number value can be suitably determined by ASTM Method D1510.

Representative of the relatively high reinforcing carbon blacks, which are not the primary carbon blacks required in the practice of this invention are, for example, carbon blacks having ASTM designations such as N110, N121 and N234.

Carbon blacks required for use in this invention having DBP values above 250 with associated Iodine numbers above 500 are considered herein to have substantially less rubber reinforcing ability for the tread rubber composition and, therefore, are normally considered to be unsatisfactory by themselves for tire tread rubber reinforcement. The contemplated benefit of use of such carbon blacks as the primary carbon black in this invention, which is directed to a tread rubber composition using silica as the principal reinforcing pigment and only a minor amount of carbon black, is the substantially greater electrical conductivity contribution of the required primary carbon black rather than its rubber reinforcement contribution.

Representative examples of carbon blacks contemplated for use as the primary carbon black in the practice of this invention are, for example, Corax XE-2 from the Degussa company having a DBP value of about 400 and an Iodine number of about 1000, 23 MM from the MMM company having a DBP value of about 300 and an Iodine number of about 600, Ketjen EC600J and Ketjen EC300J from the AKZO company having a DBP value of about 550 and 360 respectively and an Iodine number of about 1040 and 800 respectively.

In further accordance with this invention, a tire tread rubber composition is contemplated to be provided having a volume electrical resistivity of less than about 10 to the 8$^{th}$ ohm-cm.

The thermal conductivity of the rubber composition can be suitably be determined by Holometrix TCA 300 or by the K-FIND method procedure.

Elastomers contemplated for use in this invention are diene-based elastomers such as homopolymers and copolymers of conjugated dienes such as isoprene and 1,3-butadiene and copolymers of such dienes with a vinyl aromatic compound such as styrene and/or alpha-methylstyrene, preferably styrene.

Accordingly, such elastomers may be, for example, cis 1,4-polyisoprene whether natural or synthetic, 3,4-polyisoprene, cis 1,4-polybutadiene, trans 1,4-polybutadiene, high vinyl polybutadiene having about 35 to about 95 percent vinyl 1,2-content, isoprene/butadiene copolymers, butadiene/styrene copolymers, and styrene/isoprene/butadiene terpolymers.

Numerous coupling agents taught for use in coupling silica and diene-based elastomers may be used in the practice of this invention for coupling both the silica and the said additives to the diene bases elastomer(s) for the tire tread rubber composition, particularly such couplers where the moiety for interacting with the elastomer is a polysulfide and the moiety for reacting with the silica (e.g. silanol groups) is a silane such as, for example, an alkoxysilane. For example, various alkoxysilane-based coupling agents might be used which contain a polysulfide bridge such as, for example, bis(trialkoxysilylalkyl) polysulfide having from about 2 to about 8, usually an average of about 2 to about 5, sulfur atoms in the sulfur bridge, particularly an average in a range of about 2 to about 2.5 or about 3.5 to about 4, where such alkyl groups may be selected from, for example, methyl, ethyl and propyl radicals, with the alkoxy groups preferably being selected from methoxy and ethoxy groups. A representative example could be bis(triethoxysilylpropyl) polysulfide.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

The siliceous pigment (silica) may, for example, have an ultimate particle size in a range of 50 to 10,000 angstroms, preferably between 50 and 400 angstroms. The BET surface area of the pigment, as measured using nitrogen gas, is in a range of about 80 to about 300, although more usually in a range of about 100 to about 200, although perhaps even up to about 360, square meters per gram. The BET method of measuring surface area is described in the *Journal of the American Chemical Society*, Volume 60, page 304 (1930).

The silica may typically have a dibutylphthalate (DBP) absorption value in a range of about 150 to about 350, and usually about 200 to about 300.

The silica might have an average ultimate particle size, for example, in a range of about 0.01 to 0.05 micron as determined by the electron microscope, although the silica particles may be even smaller in size.

Various commercially available silicas may be considered for use in this invention such as, for example only and without limitation, silicas commercially available from PPG Industries under the Hi-Sil trademark with designations 210, 243, etc; silicas available from Rhone-Poulenc, such as, for example, Zeosil 1165MP and silicas available from Degussa AG with designations such as, for example, VN2, VN3, BV 3370GR and silicas from J. M Huber company such as, for example, Hubersil 8745.

It is readily understood by those having skill in the art that the rubber composition of the tread rubber would be compounded by methods generally known in the rubber compounding art, such as mixing the various sulfur-vulcanizable constituent diene polymers with various commonly used additive materials such as, for example, curing aids, such as sulfur, activators, retarders and accelerators, processing additives, such as oils, resins including tackifying resins, and plasticizers, pigments, fatty acid, zinc oxide, waxes, antioxidants and antiozonants, peptizing agents and reinforcing fillers such as, for example, silica and silica-carbon black mix. As known to those skilled in the art, depending on the intended use of the sulfur vulcanizable and sulfur vulcanized compounds or tread compounds, the additives mentioned above are selected and commonly used in conventional amounts.

Typical additions of carbon black and silica for this invention are hereinbefore set forth. The selection of the type of silica and carbon black is well within an optimization skill by one having skill in the rubber compounding for tire treads, depending somewhat upon the intended use, purpose and properties for the tire tread. Typical amounts of tackifier resins, if used, comprise about 0.5 to about 10 phr, usually about 1 to about 5 phr. Typical amounts of processing aids comprise about 1 to about 80 phr. Such processing aids can include, for example, aromatic, naphthenic, and/or paraffinic processing oils or plasticizer or low softening point polyethylene ether glycols. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr. Typical amounts of fatty acids, if used, which can include stearic acid comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. An antioxidant may be, for example, of the para-phenylene diamine and/or dihydrotrimethylquinoline type.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization on-set.

In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate the cure and to improve the properties of the vulcanizate. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The selection and amounts of the various compounding ingredients are not considered to be critical for the purposes of this invention, except where they may be especially emphasized elsewhere in this description, and can be adjusted or modified by the practitioner as deemed suitable for the desired tire tread properties.

The tire can be built, shaped, molded and cured by various methods which are readily apparent to those having skill in such art.

The rubber composition, or compound, for the tire tread may be prepared, for example, by mixing the ingredients in several sequential non-productive stages (without the sulfur and associated accelerator(s) curatives together with antidegradants) to temperatures of about 165° C. followed by a final productive mixing stage to a temperature of about 105° C. in which the curatives and antidegradants are added. An internal rubber mixer (Banbury type) is used. The resulting rubber compounds may then be extruded to form tread strips which, in turn, may be built onto a tire carcass and the resulting assembly vulcanized in a suitable mold at a temperature of about 150° C. to form a tire.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread of a rubber composition comprised of, based upon 100 phr of elastomer(s), (A) 100 phr of at least one diene-based elastomer, (B) about 35 to about 110 phr of reinforcing filler composed of about 15 to about 25 phr of carbon black and correspondingly about 20 to about 85 phr of precipitated silica and (C) a silica coupler having a moiety reactive with silanol groups on the surface of said silica and another moiety interactive with at least one of said diene-based elastomers; characterized in that said carbon black consists of at least 30 phr of a first carbon black characterized by having a DBP adsorption value in a range of about 280 to about 600 $cm^3/100$ g and an Iodine adsorption value in a range of about 550 to about 1200 g/kg and not more than 8 phr of a second carbon black characterized by DBP adsorption value in a range of about 100 to about 150 $cm^3/100$ g and an Iodine adsorption value in a range of about 40 to about 150 g/kg, and further characterized in that said second carbon black is a carrier for the silica coupler; where the silica coupler is a liquid bis(trialkoxysilylalkyl) polysulfide having an average of about 2 to 5 sulfur atoms in its polysulfidic bridge.

2. The tire of claim 1 wherein said tread rubber composition has a volume electrical resistivity of less than 10 to the eighth ohm-cm according to DIN 53682.

3. The tire of claim 1 wherein said silica coupler is a bis(triethoxysilylproply) polysulfide.

4. The tire of claim 1 wherein said diene-based elastomer is selected from about at least one of homopolymers and copolymers of isoprene and/or 1,3-butadiene and copolymers of isoprene and/or 1,3-butadiene with styrene or alpha-methylstyrene.

5. The tire of claim 4 wherein said silica coupler is a bis(trialkoxysilylalkyl) polysulfide having an average of from 2 to about 5 sulfur atoms in its polysulfidic bridge and where said alkyl groups are selected from methyl, ethyl and propyl groups.

6. The tire of claim 5 wherein, for said silica coupler, said alkoxy groups are selected from methoxy and ethoxy groups.

* * * * *